United States Patent [19]

Kugimiya

[11] 4,265,949
[45] May 5, 1981

[54] MULTILAYER BAG STRUCTURE FOR PACKAGING

[75] Inventor: Kazuya Kugimiya, Ohtake, Japan

[73] Assignee: Mitsui Petrochemical Industries, Ltd., Tokyo, Japan

[21] Appl. No.: 50,132

[22] Filed: Jun. 19, 1979

[30] Foreign Application Priority Data

Jun. 29, 1978 [JP] Japan .................................. 53/78100

[51] Int. Cl.$^3$ ........................ B65D 31/02; B32B 27/08
[52] U.S. Cl. ...................................... 428/35; 428/516; 526/125
[58] Field of Search ................... 428/35, 516; 526/125

[56] References Cited

U.S. PATENT DOCUMENTS

| | | | |
|---|---|---|---|
| 4,071,674 | 1/1978 | Kashiwa et al. | 526/125 |
| 4,123,576 | 10/1978 | Kobayashi et al. | 428/35 |

FOREIGN PATENT DOCUMENTS

| | | |
|---|---|---|
| 53-92887 | 8/1978 | Japan . |
| 53-125452 | 11/1978 | Japan . |
| 1485520 | 9/1977 | United Kingdom . |

*Primary Examiner*—Thomas J. Herbert, Jr.
*Attorney, Agent, or Firm*—Sherman & Shalloway

[57] ABSTRACT

A multilayer bag structure having at least two laminated layers, the innermost layer being composed of a random copolymer of ethylene and an alpha-olefin having 5 to 10 carbon atoms, said copolymer having the following characteristics: (1) it has an ethylene content of 99.5 to 94 mole %, (2) it has a melt index at 190° C. of 0.1 to 20, (3) it has a density of 0.915 to 0.940 g/cm$^3$, (4) it has a p-xylene-soluble content (A) at 25° C. of 0.5 to 5% by weight, (5) it has a boiling n-heptane-insoluble content (B) of not less than 8% by weight to less than 20% by weight, and (6) the total of (A) and (B) is not more than 20% by weight.

9 Claims, No Drawings

MULTILAYER BAG STRUCTURE FOR PACKAGING

This invention relates to an improved packaging multilayer bag structure having superior transparency and hot tack property as well as superior heat seal strength, impact strength, heat resistance, strength and oil resistance.

More specifically, this invention relates to a multilayer bag structure having at least two laminated layers, the innermost layer being composed of a random copolymer of ethylene and an alpha-olefin having 5 to 10 carbon atoms, said copolymer having the following characteristics:

(1) it has an ethylene content of 99.5 to 94 mole%,
(2) it has a melt index at 190° C. of 0.1 to 20, preferably 0.5 to 10,
(3) it has a density of 0.915 to 0.940 g/cm$^3$, preferably 0.920 to 0.935 g/cm$^3$,
(4) it has a p-xylene-soluble content (A) at 25° C. of 0.5 to 5% by weight,
(5) it has a boiling n-heptane-insoluble content (B) of not less than 8% by weight to less than 20% by weight, and
(6) the total of (A) and (B) is not more than 20% by weight.

Packaging multilayer bag structures having at least two laminated layers of different materials have previously been known. The defects of the different materials constituting the individual layers are offset to provide bag structures having improved properties. For example, in packaging foodstuffs, there is frequently used a multilayer packaging bag composed of a resin layer having superior transparency, mechanical properties, rigidity, heat resistance and gas-barrier property such as a layer of a polyamide, a polyester, a vinylidene chloride resin or an ethylene/vinyl alcohol copolymer and a resin layer having good transparency, heat sealability and impact strength such as polyethylene, polypropylene, and ethylene/vinyl acetate copolymer, or an ionomer.

Usually, such a packaging multilayer bag structure having at least two laminated layers is produced by superposing laminate films and heat sealing their edges in a manner to form a bag structure. Accordingly, a resin film layer having good heat sealability is used as the innermost layer of the bag structure. This innermost resin layer should be made of a resin which, on contact with articles being packed, is free from extraction of resin components or from degradation.

It has been found that with the diversification of articles to be packaged and the mode of use of packaging bag structures in recent years, various troubles have occurred in resin layers which have previously been utilized as the innermost layer of packaging bag structures. For example, polypropylene used as the innermost resin layer does not suffer from troubles during contact with articles being packaged, but has the disadvantage that its heat-sealable temperature is relatively high and is limited to a narrow range. An ethylene/vinyl acetate copolymer has good heat-sealability, but has unsatisfactory heat resistance, strength and oil resistance and moreover, gives off a smell of acetic acid. Low-density polyethylene, on the other hand, has insufficient heat-sealing strength and unsatisfactory hot tack property.

Japanese Laid-Open Patent Publication No. 125452/73 (of which inventorship includes the inventor of the present application) published on November 1, 1978 discloses a polyolefin composition having improved transparency and moldability without substantially impairing the excellent impact strength, tear resistance and rigidity of an ethylene/alpha-olefin copolymer, said polyolefin composition comprising 99 to 60 parts by weight of a random copolymer of ethylene and an alpha-olefin containing 5 to 10 carbon atoms and 1 to 40 parts by weight of low-density polyethylene, said random copolymer being prepared by polymerization at a temperature above the melting temperature of the copolymer using a catalyst composed of a titanium-containing solid composition and an organoaluminum compound supported on a hydrocarbon-insoluble solid carrier, and said copolymer having an ethylene content of 99.5 to 90 mole%, a melt index at 190° C. of 0.1 to 20 and a density of 0.910 to 0.940 g/cm$^3$. To achieve the improved properties to a marked degree, the above random copolymer further has the following characteristics:

(a) it has a p-xylene-soluble content (A) at room temperature of 0.1 to 20% by weight, especially 1 to 15% by weight,
(b) it has a boiling n-heptane-insoluble content (B) of 10 to 50% by weight, especially 15 to 40% by weight, and
(c) the total of (A)+(B) is 20 to 60% by weight, especially 25 to 45% by weight.

In the above prior application, it is essential to use 1 to 40 parts by weight of high-pressure polyethylene in combination with the random copolymer of ethylene and an alpha-olefin containing 5 to 10 carbon atoms. To obtain a better result, the total of (A)+(B) should be 20 to 50% by weight, especially 25 to 45% by weight. All the embodiments shown in this application meet the (A)+(B) requirement [(A)+(B)=33.5–39.9% by weight]. This prior application does not at all refer to the properties, especially hot tack property, such a polymer mixture as a layer of a bag structure, and Comparative Examples show that the use of a random copolymer in which (A)+(B) is 33.5 to 39.9% by weight is disadvantageous.

The present inventor has extensively worked to find out a material most suitable to be the innermost layer of a bag structure having at least two laminated layers. Consequently, it has been found that a random copolymer of ethylene and an alpha-olefin having 5 to 10 carbon atoms having (1) a specified ethylene content, (2) a specified melt index, (3) a specified density, (4) a p-xylene-soluble content (A) at 25° C. of 0.5 to 5% by weight, (5) a boiling n-heptane-insoluble content (B) of not less than 8% by weight to less than 20% by weight with (6) the total of (A)+(B) being not more than 20% by weight has very good suitability as a material for the innermost layer of a multilayer bag structure for packaging. The (A)+(B) requirement in this random copolymer is quite different from that in the prior application, and moreover, the random copolymer can be used alone without blending with another polymer.

It has been found that this particular random copolymer of ethylene and an alpha-olefin having 5 to 10 carbon atoms has very good hot tack property in addition to good heat sealing strength, impact strength, transparency and other favorable properties, and is very suitable for use as the innermost layer of a multilayer bag structure for packaging. In particular, it has been found that the random copolymer having a total of (A)+(B) of not more than 20% by weight contrary to the (A)+(B) requirement recommended in the prior 1) application in addition to the requirements (1) to (5) outstanding hot tack property without adverse effects on the other desirable properties, and therefore, articles can be packaged at high speeds by using the bag structure of this invention.

The "hot tack property" denotes the force of thermoplastic resin films to pull each other at the optimum heat sealing temperature of the films (about 120° to 170° C. in the case of polyethylene films) which results from their tack forces and cohesive forces. While the heat-sealing strength of a resin film is the strength of a sealed portion measured after the heat-sealed portion has cooled to room temperature (when the resin of the film has solidified), the hot tack property denotes the heat sealing strength of a heat-sealed portion immediately after heat sealing when that portion is still close to the heat sealing temperature.

In high-speed packaging, articles are usually packed while the heat-sealed portions of a bag structure are still in the unsolidified state and are at a temperature close to the heat-sealing temperature, and this tendency is more outstanding at higher speeds of packaging. When the bag structure does not possess sufficient hot tack property, the heat-sealed portions will undergo rupture by the weight of the packaged articles. Accordingly, the hot tack property of the bag structure can be a factor that dominates the success of high-speed packaging. In accordance with this invention, it has been found that by using the aforesaid random copolymer having the characteristics (1) to (6) as the innermost layer of a multilayer bag structure, the bag structure has satisfactory hot tack property, and can permit high-speed packaging without troubles.

It is an object of this invention to provide a packaging multilayer bag structure having at least two laminated layers which has improved properties.

The above and other objects of this invention along with its advantages will become apparent from the following description.

The random copolymer of ethylene and an alphaolefin having 5 to 10 carbon atoms which constitutes the innermost layer of the multilayer bag structure of this invention has the following characteristics (1) to (6).

(1) It has an ethylene content of 99.5 to 94 mole%, preferably 99 to 95 mole%, more preferably 98 to 96 mole%.
(2) It has a melt index at 190° C. of 0.1 to 20, preferably 0.5 to 10, more preferably 1 to 5.
(3) It has a density of 0.915 to 0.940 g/cm$^3$, preferably 0.920 to 0.935 g/cm$^3$.
(4) It has a p-xylene-soluble content (A) at 25° C. of 0.5 to 5% by weight, preferably 0.5 to 3.5% by weight.
(5) It has a boiling n-heptane-insoluble content (B) of not less than 8% by weight to less than 20% by weight, preferably not less than 10% by weight to not more than 18% by weight.
(6) The total of (A)+(B) is not more than 20% by weight.

Examples of the alpha-olefin used to prepare the random copolymer in accordance with this invention are 1-pentene, 1-hexene, 4-methyl-1-pentene, 1-octene, 1-decene, and mixtures of these. Of these, alpha-olefins having 6 to 8 carbon atoms are preferred, and 4-methyl-1-pentene is especially preferred.

If the ethylene content (1) is less than 94 mole%, the crystallinity of the copolymer is reduced to render the copolymer tacky and thus unable to be molded into a useful film. If the ethylene content (1) is larger than 99.5 mole%, the transparency of the copolymer is aggravated. It is necessary therefore to use a random copolymer having an ethylene content within the above-specified range.

The melt index (2) of the random copolymer is measured in accordance with the method of ASTM D-1238-65T at 190° C. under a load of 2,160 g. If the melt index of the copolymer is lower than the above-specified lower limit, the film-formability of the copolymer is degraded, and if it exceeds the specified upper limit, a film prepared from the copolymer has unsatisfactory impact strength, tear strength and heat sealing strength. Thus, the random copolymer in accordance with this invention should have a melt index within the specified range.

The density (3) of the random copolymer is measured in accordance with the method of ASTM-D-1505. If the density of the copolymer is higher than the above-specified upper limit, the copolymer tends to have unsatisfactory hot tack property, transparency and impact strength. If the density is lower than the specified lower limit, the mechanical strength and oil resistance of the random copolymer tend to become unsatisfactory and the surface of the resulting film will become tacky. Accordingly, the random copolymer of this invention should have the density specified in (3) above. Reduced oil resistance produces a bad result in packaging oily foodstuffs, and the surface tackiness causes blocking.

The p-xylene-soluble content (A) at 25° C. and (4) and the boiling n-heptane-insoluble content (B) (5) of the random copolymer are measures for the distribution of the composition of the random copolymer. When the average molecular weight and density remain the same, higher (A) contents mean a higher content of a copolymer having a low-molecular-weight and/or an amorphous copolymer. Higher (B) contents show that the content of the polyethylene crystal portion in the copolymer is larger, and for example, the copolymerization is not performed uniformly.

The p-xylene-soluble content (A) at 25° C. and the boiling n-heptane-insoluble content (B) are determined by a Soxhlet extraction method.

The combination of the requirements (4), (5) and (6) in combination with the other characteristics (1) to (3) contributes to the desirable hot tack property of the innermost layer of the bag structure of this invention as well as to its other superior properties.

The random copolymer of ethylene and an alpha-olefin in accordance with this invention can be produced by using a catalyst composed of an organoaluminum compound and a highly active titanium catalyst ingredient, for example, a solid titanium catalyst ingredient deposited on a hydrocarbon-insoluble magnesium compound.

The highly active titanium catalyst ingredient is preferably a titanium catalyst ingredient supported on a compound containing a magnesium halide, especially magnesium chloride, or magnesium oxide and preferably has a Cl/Ti weight ratio of from 5 to 150, a Ti/Mg mole ratio of from 3 to 90 and a surface area of at least 70 m$^2$/g especially at least 150 m$^2$/g. The catalysts described in U.S. Pat. No. 4,071,674 (corresponding to Japanese Patent Publication No. 32270/75) and British Patent No. 1,485,520 (corresponding to Japanese Laid- Open Patent Publication No. 95382/75) are especially preferred.

The organoaluminum compound to be used in combination with the above titanium catalyst ingredient is, for example, an organoaluminum compound of the following empirical formula

$$R_nAlX_{3-n}$$

wherein R is a hydrocarbon group such as an alkyl group having 1 to 10 carbon atoms, X represents hydrogen, chlorine or an alkoxy group having 2 to 4 carbon atoms, and n is from 1 to 3.

A mixture of two or more organoaluminum compounds may be used if its average composition falls within this empirical formula. Alkylaluminum sesquichlorides and/or dialkylaluminum halides, and particularly, alkylaluminum halides, and mixtures of alkylaluminum halides and dialkylaluminum halides are preferred for the formation of a copolymer having excellent transparency.

The random copolymer in accordance with this invention may be prepared preferably in the presence of a hydrocarbon solvent, or using the monomer itself as a solvent, at a temperature above the melting point of the resulting copolymer, preferably at a temperature of at least 140° C., preferably under such conditions that the solvent and the copolymer form a homogeneous phase. Preferably, the polymerization is carried out continuously while maintaining the concentrations of the monomers constant. The conditions under which the solvent and the copolymer form a homogeneous phase vary depending upon the type of the solvent, the concentrations (pressures) of monomers or hydrogen in the solution, the polymerization temperature, the molecular weight (intrinsic viscosity) of the copolymer, etc., but can be determined by preliminary tests. The polymerization is preferably carried out under elevated pressures, for example 2 to 100 kg/cm$^2$, preferably 15 to 70 kg/cm$^2$. The polymerization conditions for preparing the ethylene/alpha-olefin random copolymer used in this invention are disclosed in detail in Japanese Laid-Open Patent Publication No. 92,887/78, and can be used in the present invention.

The random copolymer in accordance with this invention may contain minor amounts of other resins so long as it does not impair the objects of this invention. For example, it may contain up to about 65% by weight, based on the random copolymer, of another resin. Examples of the other resin are olefinic polymers such as high-density polyethylene, a copolymer of ethylene with an alpha-olefin having 3 or 4 carbon atoms, polypropylene, poly-1-butene, an ethylene/vinyl acetate copolymer, and an ethylene/acrylate copolymer, and rubbers such as ethylene-propylene rubber, ethylene-propylene-nonconjugated rubber, polyisobutylene and butyl rubber. These rubbers may be modified with epoxy-containing compounds, carboxyl-containing compounds and their functional derivatives by a grafting technique. Essentially, however, blending of such a resin is unnecessary in this invention, and the use of the random copolymer alone is preferred.

The innermost layer of the bag structure of this invention composed of the random copolymer may contain conventional additives. Such additives and the amounts thereof can be properly selected. For example, the innermost layer may contain, based on the weight of the random copolymer, about 0.1 to about 0.3% by weight of a weather-resisting agent such as 2-(2'-hydroxy-3'-t-butyl-5'-methylphenyl)-5-chlorobenzotriazole, bis(2,2,6,6-tetramethyl-4-piperidine)sebacate, or 2-hydroxy-4-n-octoxybenzophenone, about 0.05 to about 0.2% by weight of a heat stabilizer such as tetrakis[methylene-3-(3',5'-di-t-butyl-4-hydroxyhydrocinnamate)]methane or butylated hydroxytoluene, about 0.01 to about 0.5% by weight of an antistatic agent such as Electrostripper EA [N,N-bis(2-hydroxyethyl)alkyl ($C_{12-16}$)amine] or Denon 331 P (a monoester of an EO adduct of alkylamine), about 0.1 to about 0.3% by weight of an anti-clouding agent such as stearyl monoglyceride or a sorbitan fatty acid ester, about 0.05 to about 0.2% by weight of an antiblocking agent such as silica, about 0.05 to about 0.25% by weight of a slip agent such as erucamide, oleic acid amide or an ethylenebisfatty acid amide, about 0.05 to about 0.25% by weight of a lubricant such as calcium stearate, paraffin or higher fatty acids, or about 0.1 to about 0.3% by weight, of a coloring agent such as yellow iron oxide, red iron oxide or titanium oxide.

The random copolymer of ethylene with an alpha-olefin having 5 to 10 carbon atom having the characteristics (1) to (6) is used as the innermost layer of the multilayer bag structure of this invention having at least two laminated layer. An outer layer or layers may be made of a wide range of film-forming synthetic resins, papers, metal foils, cellulose derivatives, etc. The papers may be those formed from various pulps such as natural pulps, synthetic pulps, and mixtures thereof. The metal foils may be aluminum foils, and aluminum deposited synthetic resin films. The cellulose derivatives include cellulose acetate, cellulose nitrate and ethyl cellulose. Examples of the film-forming synthetic resins include olefinic resins such as high-density polyethylene, medium-density polyethylene, low-density polyethylene, an ethylene/vinyl acetate copolymer, ionomers, polypropylene, poly-1-butene or poly-4-methyl-1-pentene, vinyl polymers such as polyvinyl chloride, polyvinylidene chloride, polystyrene, polyacrylates and polyacrylonitrile, polyamides such as nylon 6, nylon 66, nylon 7, nylon 10, nylon 11, nylon 12, nylon 610, or poly(meta-xylylene adipamide), polyesters such as polyethylene terephthalate, polyethylene terephthalate/isophthalate, or polybutylene terephthalate, vinyl alcohol polymers or copolymers such as polyvinyl alcohol or an ethylene/vinyl alcohol copolymer, and polycarbonates.

The material for the outer layer may be selected properly according to the purpose of packaging, and the kinds of articles to be packaged. For example, when foodstuffs which are susceptible to spoilage are to be packaged, a resin having superior transparency, rigidity and gas-barrier property, such as polyamides, polyvinylidene chloride, an ethylene/vinyl alcohol copolymer, polyvinyl alcohol or polyesters, is selected. For packaging confectionary and fibers, polypropylene having good transparency, rigidity and resistance to water permeation can be selected as the outer layer.

The multilayer bag structure in accordance with this invention consists of at least two layers, and the innermost layer is composed of the random ethylene/alpha-olefin copolymer described hereinabove. The number of laminated layers may be three or more. The innermost layer is a layer of a substantially unstretched film of the aforesaid random copolymer, but other layers of the bag structure may be stretched monoaxially or biaxially.

The multilayer bag structure of this invention is not limited to one consisting only of resin layers, and packaging bag structures including a layer of an aluminum foil, or paper are also within the scope of the invention.

The thickness of each of the layers in the multilayer bag structure of this invention is not particularly limited. Usually, it is 1 to 100 microns, preferably 5 to 40 microns.

Some specific embodiments of the multilayer bag structure of this invention are shown below. In the following illustration, random copolymer (a) means the random copolymer of ethylene with an alpha-olefin having 5 to 10 carbon atoms which has the characteristics (1) to (6).

Two-layer structures such as unstretched polypropylene/random copolymer (a), biaxially stretched polypropylene/random copolymer (a), stretched or unstretched high-density polyethylene/random copolymer (a), stretched or unstretched nylon/random copolymer (a), unstretched ethylene/vinyl alcohol copolymer/random copolymer (a), biaxially stretched polyethylene terephthalate/random copolymer (a), or unstretched polybutylene terephthalate/random copolymer (a); three-layer structures such as biaxially stretched polypropylene/unstretched low-density polyethylene/random copolymer (a), stretched or unstretched polyvinylidene chloride/biaxially stretched polypropylene/random copolymer (a), biaxially stretched polyethylene terephthalate/aluminum foil/random copolymer (a), stretched or unstretched polyethylene/stretched or unstretched nylon/random copolymer (a), random copolymer (a), stretched or unstretched nylon/random copolymer (a), stretched or unstretched polypropylene/stretched or unstretched nylon/random copolymer, stretched or unstretched polyethylene/unstretched ethylene-vinyl alcohol copolymer/random copolymer (a), stretched or unstretched nylon/unstretched ethylene-vinyl alcohol copolymer/random copolymer (a), stretched or unstretched polyvinylidene chloride/stretched or unstretched nylon/random copolymer (a), biaxially stretched polypropylene/unstretched polyvinyl alcohol/random copolymer (a), stretched or unstretched polyvinylidene chloride/stretched or unstretched nylon/random copolymer (a), biaxially stretched polypropylene/unstretched polyvinyl alcohol/random copolymer (a) or stretched or unstretched vinylidene chloride/biaxially stretched polyethylene terephthalate/random copolymer (a); and 4-layered structures such as stretched or unstretched polyvinylidene chloride/biaxially stretched polypropylene/unstretched low-density polyethylene/random copolymer (a), unstretched polyethylene terephthalate/unstretched low-dinsity polyethylene/aluminum foil/random copolymer (a), or stretched or unstretched polypropylene/unstretched low-density polyethylene/paper/random copolymer (a).

The multilayer bag structure of this invention can be produced by various known means for producing multilayer bag structures for example, the individual layers may be laminated by such a known means as a dry laminating method, an extrusion laminating method, a sandwich laminating method or a coextrusion method to form a laminated film. Such laminated films may be superimposed such that the layers of the random copolymer (a) specified in this invention contact each other, and then edge portions required for producing a bag structure are heat-sealed by a heat sealer. Any known types of heat sealer can be used. The sealing temperature is preferably in the range of 110° C. to 180° C.

The multilayer bag structure of this invention, because of the use of the specified ethylene/alpha-olefin random copolymer as the innermost layer, has better hot tack property, higher sealing strength, and better impact strength and tear resistance than conventional packaging bags including low-density polyethylene obtained by a high-pressure method as the innermost layer. Usually, the multilayer bag structure of this invention has a hot tack property of not more than about 25 mm at 150° C., and not more than about 15 mm at 170° C. Another advantage is that the multilayer bag structure of this invention has better sealing strength, oil resistance, heat resistance and rigidity than packaging bags including an ethylene/vinyl acetate copolymer as the innermost layer. Furthermore, the bag structure of the invention has better heat resistance and boiling water resistance that packaging bags including an ionomer as the innermost layer.

The packaging bag structure of this invention can be used for packaging various articles. In particular, it can be suitably used in the field of food packaging for packaging water-containing foodstuffs such as pickles, soybean curds ("tofu") and jams, and oily foodstuffs such as curry and rice, barbecue sauces, soups, butter and cheese.

The following Examples are given to illustrate the embodiments of this invention in greater detail.

REFERENTIAL EXAMPLE 1

Production of an ethylene/4-methyl-1-pentene random copolymer (E-4MP copolymer)

Catalyst preparation

Commercially available anhydrous magnesium chloride (10 moles) was suspended in 50 liters of dehydrated and purified hexane in a stream of nitrogen, and with stirring, 60 moles of ethanol was added dropwise over the course of 1 hour. Then, they were allowed to react at room temperature for 1 hour. To the reaction mixture was added dropwise 27 moles of diethylaluminum chloride at room temperature, and the mixture was stirred for 1 hour. Then, 100 moles of titanium tetrachloride was added, and the mixture was heated to 70° C. and reacted for 3 hours with stirring. The resulting solid was separated by decantation, washed repeatedly with purified hexane, and formed into a suspension in hexane. The concentration of titanium was determined by titration.

Polymerization

A 200-liter reaction for continuous polymerization was continuously charged with 80 liters/hr of dehydrated and purified hexane, 32 millimoles/hr of ethylaluminum sesquichloride and 1.2 millimoles/hr, as titanium, of the supported titanium catalyst prepared as above. Simultaneously, 13 kg/hr of ethylene, 13.0 kg/hr of 4-methyl-1-pentene and 200 liters/hr of hydrogen were fed into the reactor continuously. A copolymer of ethylene and 4-methyl-1-pentene was prepared at a polymerization temperature of 145° C. under a total pressure of 30 kg/cm$^2$.G while adjusting the residence time to 1 hour and the concentration of the copolymer based on the hexane solvent to 112 g/liter. The resulting copolymer had a density of 0.921 g/cm$^3$, a melt index of 4.3, a molecular weight of 2,560,000, an ethylene content of 97.2 mole%, a p-xylene-soluble content (A) of 2.4% by weight and a boiling n-heptane-insoluble content (B) of 11.6% by weight.

REFERENTIAL EXAMPLE 2

Catalyst preparation

In a stream of nitrogen, 10 moles of commercially available anhydrous magnesium chloride was suspended in 50 liters of dehydrated and purified hexane, and with stirring, 60 moles of ethanol was added dropwise over the course of 1 hour. The mixture was reacted at room temperature for 1 hour. To the reaction mixture was added dropwise 28 moles of diethylaluminum chloride at room temperature, followed by stirring for 1 hour. Subsequently, 7 moles of titanium tetrachloride and 7 moles of triethyl aluminum were added. Reducing reaction was performed with stirring at room temperature for 4 hours, whereupon the color of the solid changed to light brown peculiar to trivalent titanium. The titanium concentration of the resulting hexane suspension was determined by titration.

Polymerization

The same polymerization reactor as used in Example 1 was charged continuously with 80 liters/hr of dehydrated and purified hexane, 32 millimoles/hr of ethylaluminum sesquichloride, 1.2 millimoles/hr, as titanium, of the supported catalyst prepared as described above, and simultaneously, 12.0 kg/hr of ethylene, 11.0 kg/hr of 4-methyl-1-pentene and 110 liters/hr of hydrogen were fed continuously. A copolymer of ethylene and 4-methyl-1-pentene was prepared at a polymerization temperature of 145° C. under a total pressure of 28 kg/cm$^2$.G while adjusting the residence time to 1 hour and the concentration of the resulting copolymer based on the hexane solvent to 110 g/liter. The resulting copolymer had a density of 0.923 g/cm$^3$, a melt index of 4.66, an ethylene content of 96.6 mole%, a p-xylene-soluble content (A) of 3.1% by weight, and a boiling n-heptane-insoluble content (B) of 16.1% by weight.

EXAMPLES 1 AND 2 AND COMPARATIVE EXAMPLES 1 TO 5

Formation of a film of the E-4MP copolymer

A film having a width of 180 mm and a thickness of 30 microns was formed from each of the E-4MP copolymers obtained in Referential Examples 1 and 2 by means of a commercially available tubular film former for polyolefins. At the time of film formation, the temperature of the resin was 180° C. The rotating speed of the screw of the extruder was 60 rpm, and a die having a diameter of 100 mm and a slit width of 0.5 mm was used. Cooling of the film was carried out in one step using air. The properties of the E-4MP copolymer films are shown in Table 1.

Formation of biaxially stretched polypropylene film

Polypropylene film having a melt index of 0.5 was melted at 270° C. in an extruder, extruded from a die of the coat hanger type, and cooled with chill rolls. The cooled film was stretched to 5 times in the longitudinal direction using stretch rolls at 130° C. to form a monoaxially stretched sheet having a thickness of 250 microns. The sheet was then stretched to 7 times in the transverse direction by a tenter-type sideway stretcher at 155° C., and cooled while maintaining the sheet substantially in the stretched state. Thus, a biaxially stretched film of polypropylene having a thickness of 20 microns (to be abbreviated "OPP film") was obtained.

Formation of laminated film

The OPP film and the E-4MP copolymer film formed as described above were laminated by extrusion laminating of low-density polyethylene (melt index 7, density 0.917 g/cm$^3$; to be abbreviated "LDPE") molten and heated to 290° C. by an extruder to form a three-layer laminated film of OPP/LDPE/E-4MP copolymer (thickness 20 microns/20 microns/30 microns).

Two laminated films were superposed so that the E-4MP copolymer film surfaces contacted each other. Both side portions and the bottom portion of the assembly were heat sealed by a heat sealer while maintaining the temperature of a seal bar at 145° C. to form a bag having a length of 200 mm and a width of 150 mm. Test specimens were cut out from the resulting bag, and tested for various properties. The results are shown in Table 2.

Tables 1 and 2 also show the results obtained with bags made of laminated films prepared in the same way as in Examples 1 and 2 except that E-4MP copolymers obtained by a method similar to the method shown in Referential Examples 1 and 2 but not meeting the combination of requirements (1) to (6) specified in this invention were used. Tables 1 and 2 further show the results obtained by using an ethylene/vinyl acetate copolymer (melt index 4, vinyl acetate content 5.5% by weight) instead of the E-4MP copolymer.

The various properties were determined by the following methods.

(1) Haze value: ASTM-D-1003
(2) Tear strength: ASTM-D-1004
(3) Impact strength: ASTM-D-3420
(4) Peel strength of the heat-sealed part A test specimen having a width of 15 mm including the heat-sealed portion was cut out, and dipped for 30 minutes in water at 23° C., 80° C. and 95° C., respectively. Then, the peel strength of the heat-sealed portion was measured by a T-peel method.

(5) Bag breaking strength

Bags were filled with 150 cc or 200 cc or water and the top portion of each bag was heat-sealed by a heat sealer while maintaining the seal bar temperature at 145° C. The bags were then let fall from a height of 2 mm onto the surface of a polyvinyl chloride tile, and the number of broken bags per 100 bags was counted.

(6) Hot tack property

Two samples of the laminated film each having a length of 500 mm and a width of 35 mm were set on a heat sealer receiving table such that the innermost layers of these samples contacted each other. One end of each of these samples was fixed in position by hand, and the other end of each sample was provided with a weight (18g). The superposed samples were passed between a pair of roller rods positioned apart from a heat seal bar, 10 mm wide and 300 mm long, above the receiving table at right angles to the heat sealing direction, and were suspended via a pair of rollers spaced from each other so as to separate the two film samples at an angle of 22.5°. The superposed film samples on the receiving table were heat sealed by the seal bar at a predetermined temperature under a sealing pressure of 2 kg/cm$^2$ for a period of 0.5 second. As soon as the sealing was done, the samples were released from hand. When the bar was raised upon completion of heat sealing, the heat-sealed portion underwent peeling into the constituent laminated films by the effects of the weights attached to the ends of the two film samples. The peel length was then measured, and made a measure for hot tack property. Smaller peel lengths mean higher hot tack strength, and larger peel lengths mean lower hot tack strength. The heat sealing temperature was 150° C., and 170° C., respectively.

The results are shown in Tables 1 and 2.

TABLE 1

| Example (Ex.) or Comparative Example (CEx.) | Ethylene content (mole %) | Melt index at 190° C. | Density (g/cm³) | p-Xylene-soluble content (A) (wt. %) | Boiling n-heptane-insoluble content (B) (wt. %) | (A) + (B) |
|---|---|---|---|---|---|---|
| CEx. 1 | 98.5 | 2.2 | 0.942 | 0.4 | 40.0 | 40.4 |
| CEx. 2 | 96.7 | 4.7 | 0.924 | 2.3 | 20.3 | 22.6 |
| Ex. 1 | 97.2 | 4.3 | 0.921 | 2.4 | 11.6 | 14.0 |
| Ex. 2 | 96.6 | 4.66 | 0.923 | 3.1 | 16.1 | 19.2 |
| CEx. 3 | 96.5 | 4.7 | 0.924 | 3.1 | 23.1 | 26.2 |
| CEx. 4 | 96.1 | 5.21 | 0.922 | 7.6 | 31.7 | 39.3 |
| CEx. 5 | Ethylene/vinyl acetate copolymer (melt index 4, vinyl acetate content 5.5% by weight) | | | | | |

TABLE 2

| Example (Ex.) or Comparative Example (CEx.) | Haze value (%) | Tear strength (kg/cm) Longitudinal | Tear strength (kg/cm) Transverse | Impact strength (kg.cm/cm) |
|---|---|---|---|---|
| CEx. 1 | 28 | 170 | 110 | 2,000 |
| CEx. 2 | 2.5 | 180 | 120 | 2,500 |
| Ex. 1 | 0.8 | 200 | 150 | 2,900 |
| Ex. 2 | 0.9 | 190 | 130 | 2,800 |
| CEx. 3 | 3.0 | 175 | 135 | 2,600 |
| CEx. 4 | 2.3 | 190 | 140 | 2,700 |
| CEx. 5 | 5.1 | 34 | 32 | 1,800 |

| Example (Ex.) or Comparative Example (CEx.) | Peel strength at the heatsealed portion g/15 mm at 23° C. | at 80° C. | at 90° C. | Hot tack property (mm) at 150° C. | at 170° C. | 150 cc | Number of broken bags (per 100) 200 cc |
|---|---|---|---|---|---|---|---|
| CEx. 1 | 3,600 | 3,700 | 3,600 | 135 | 60 | 2 | 4 |
| CEx. 2 | 3,800 | 3,700 | 3,900 | 31 | 10 | 1 | 1 |
| Ex. 1 | 4,000 | 3,800 | 3,900 | 15 | 5 | 0 | 1 |
| Ex. 2 | 3,900 | 3,700 | 3,900 | 20 | 10 | 0 | 2 |
| CEx. 3 | 3,900 | 3,950 | 3,800 | 38 | 20 | 0 | 2 |
| CEx. 4 | 4,000 | 3,900 | 4,000 | 42 | 38 | 0 | 1 |
| CEx. 5 | 3,900 | 3,600 | * | 70 | 90 | 8 | 19 |

*The inside surface of the bag melt-adhered to itself.

EXAMPLE 3

A two-layer laminated film composed of polypropylene and E-4MP copolymer was formed by dry laminating an unstretched polypropylene film having a thickness of 40 microns to a film of E-4MP copolymer (ethylene content 97.2 mole%, melt index at 190° C. 4.3, density 0.921 g/cm³, the p-xylene-soluble content 2.4% by weight, boiling n-heptane-insoluble content 11.6% by weight) using an adhesive composed of polyethylenimine and polyurethanepolyol. A bag structure was obtained by heat-sealing the two laminated films superimposed so that the layers of the E-4MP copolymer contacted eash other.

EXAMPLE 4

A three-layer laminated film of polyvinylidene chloride/nylon/E-4MP copolymer was prepared by laminating a nylon film coated with polyvinylidene chloride and having a thickness of 30 microns, and a 50 micron-thick film of E-4MP copolymer (ethylene content 97.2 mole%, a melt index at 190° C. 4.3, density 0.921 g/cm³, p-xylene-soluble content 2.4% by weight, boiling n-heptane-insoluble content 11.6% by weight) using an isocyanate adhesive. A bag structure was formed by heat-sealing the two laminated films superimposed so that the layers of the E-4MP copolymer contacted each other.

EXAMPLE 5

A two-layer laminated film of kraft paper/E-4MP copolymer was formed by extrusion-laminating molten E-4MP copolymer at 300° C. to a thickness of 20 microns to kraft paper having a thickness of 75 microns. The E-4MP copolymer had an ethylene content of 96.6 mole%, a melt index at 190° C. of 4.66, a density of 0.923 g/cm³, a p-xylene-soluble content of 3.1% by weight, and a boiling n-heptane-insoluble content of 16.1% by weight. A bag structure was formed by heat sealing the two laminated films superimposed so that the layers of the E-4MP copolymer contacted each other.

EXAMPLE 6

A three-layer laminated film of polyester/aluminum foil/E-4MP copolymer was formed by extrusion-laminating to a thickness of 50 microns molten E-4MP copolymer (ethylene content 96.6 mole%, melt index at 190° C. 4.44, density 0.923 g/cm³, p-xylene-soluble content 3.1% by weight, boiling n-heptane-insoluble content 16.1% by weight) at 300° C. in an extruder to a laminated assembly of a 12 micron-thick polyester film and a 10 micron-thick aluminum foil. A bag structure was formed by heat sealing the two laminated films superimposed so that the layers of E-4MP copolymer contacted each other.

What we claim is:

1. A multilayer bag structure having at least two laminated layers, the innermost layer being composed of a random copolymer of ethylene and an alpha-olefin having 5 to 10 carbon atoms, said copolymer having the following characteristics:

(1) it has an ethylene content of 99.5 to 94 mole%, (2) it has a melt index at 190° C. of 0.1 to 20,
(3) it has a density of 0.915 to 0.940 g/cm$^3$,
(4) it has a p-xylene-soluble content (A) at 25° C. of 0.5 to 5% by weight,
(5) it has a boiling n-heptane-insoluble content (B) of not less than 8% by weight to less than 20% by weight, and
(6) the total of (A) and (B) is not more than 20% by weight.

2. The bag structure of claim 1 wherein the random copolymer has a density of 0.920 to 0.923 g/cm$^3$.

3. The bag structure of claim 1 wherein the p-xylene soluble content (A) of the random copolymer ranges from 0.5 to 3.5% by weight.

4. The bag structure of claim 1 wherein the boiling n-heptane-insoluble content (B) of the random copolymer ranges from not less than 10% by weight to not more than 18% by weight.

5. The bag structure of claim 1 wherein the alpha-olefin is selected from the group consisting of 1-pentene, 1-hexene, 4-methyl-1-pentene, 1-octene, 1-decene and mixture thereof.

6. The bag structure of claim 1 wherein the random copolymer has a melt index at 190° C. of 0.5 to 10.

7. The bag structure of claim 6 wherein the random copolymer has a melt index at 190° C. of 1 to 5.

8. The bag structure of claim 1 wherein the random copolymer has an ethylene content of 99 to 95 mole%.

9. The bag structure of claim 8 wherein the random copolymer has an ethylene content of 98 to 96 mole%.

* * * * *